United States Patent
Small

[19]

[11] Patent Number: 5,929,861
[45] Date of Patent: Jul. 27, 1999

[54] WALK-THROUGH RENDERING SYSTEM

[75] Inventor: Ian Small, Cupertino, Calif.

[73] Assignee: Apple Computer, Inc., Cupertino, Calif.

[21] Appl. No.: 08/709,196

[22] Filed: Aug. 23, 1996

[51] Int. Cl.⁶ .................................................. G06F 15/00
[52] U.S. Cl. .............................................. 345/427; 345/435
[58] Field of Search .................................. 345/427, 419, 345/425, 435, 439

[56] References Cited

U.S. PATENT DOCUMENTS

| | | | |
|---|---|---|---|
| 4,600,200 | 7/1986 | Oka et al. ............................ | 273/313 |
| 5,179,638 | 1/1993 | Dawson et al. ..................... | 393/125 |
| 5,396,583 | 3/1995 | Chen et al. .......................... | 345/427 |
| 5,442,733 | 8/1995 | Kaufman et al. .................... | 345/424 |
| 5,446,833 | 8/1995 | Miller et al. ........................ | 345/425 |
| 5,696,892 | 12/1997 | Redmann et al. ................... | 345/425 |

OTHER PUBLICATIONS

Foley et al., "Computer Graphics: Principles and Practice", Second Edition, pp. 472–483, Jan. 1990.

Regan et al., "Priority Rendering with a Virtual Reality Address Recalculation Pipeline", section 4, Jul. 1994.

*Primary Examiner*—Joseph H. Feild
*Assistant Examiner*—Alford W. Kindred
*Attorney, Agent, or Firm*—Sawyer & Associates

[57] ABSTRACT

The present invention provides an improved rendering system for walk-through applications. The method and system for a walk-through image rendering system in a data processing system provides a first image based on a geometry-based rendering approach in which a user's view position is changing; and also provides a second image based on an image-based representation of a scene in which the user's view position is not changing.

29 Claims, 9 Drawing Sheets

WALK-THROUGH RENDERING SYSTEM

FIELD OF THE INVENTION

The present invention relates to an interactive graphics system. More particularly, the present invention is a system and method for an improved walk-through image rendering system.

BACKGROUND OF THE INVENTION

Walk-through rendering systems allow a graphics user to move through a synthetically modeled environment via computer graphics. In such a system a user can look at aspects of the environment that are of interest, and the user can interactively control both position and orientation within the model. Walk-through rendering systems are used for various purposes including previewing of buildings by architects prior to the actual construction of the buildings, and evaluating different design options by interior designers.

In the area of walk-through rendering systems, there are two basic systems used to render an image on the screen. The classic system is referred to as the polygon-based rendering system. The polygon-based rendering system is well known in the art and described in such textbooks as *3D Graphics Programming with QuickDraw 3D,* by Apple Computer, Inc., Addison-Wesley Publishing Company, 1995.

The polygon-based rendering system describes the world in polygons, where each identifiable image is created from a combination of polygons. One constraint of the polygon-based rendering system used for walk-through systems is the amount of time available for computing an image. The image must respond interactively to the user's input, which can cause the interactive image to be a relatively crude representation of the scene.

The second basic type of rendering system is an image-based rendering system. An example of a system utilizing the image-based rendering approach is QuickTime VR, manufactured by Apple Computer, Inc. The image-based rendering system is also well known in the art and is taught by publications such as U.S. Pat. No. 5,396,583 issued Mar. 7, 1995 to Chen et al., and U.S. Pat. No. 5,446,833, issued Aug. 29, 1995 to Miller, et al., both of which are assigned to the assignee of the present invention. The image-based rendering systems describe the world as a series of images. It can be thought of as a series of still photos surrounding the viewer which can generate every view from a particular viewpoint.

In a walk-through rendering system using image-based rendering, the viewer may look around, but cannot change her location. The images projected by the image-based rendering system display a view of a scene from a single location. If the viewer's location shifts, then a new image from a new viewpoint must be generated. A walk-through rendering system utilizing image-based rendering may constrain either or both the user's location and their viewing direction at run-time. However, the images generated by the conventional image-based rendering systems are typically of higher quality than those generated by the conventional polygon-based rendering systems on a given computing platform. Because image-based rendering systems resample source images of a scene, rather than relying on a polygonal representation of that scene, the imagery can be as complex as the source image representation allows without affecting the computational cost.

What is needed therefore is a system which overcomes the disadvantages described above with respect to known rendering systems. The present invention addresses such a need.

SUMMARY OF THE INVENTION

The present invention provides an improved rendering system for walk-through applications. The method and system for a walk-through image rendering system in a data processing system provides a first image based on a geometry-based rendering approach in which a user's view position is changing; and also provides a second image based on an image-based representation of a scene in which the user's view position is not changing. Through this combination of elements, the present invention delivers the key advantages of conventional rendering systems: the freedom of movement afforded by polygon-based rendering, along with image quality associated with image-based rendering.

The preferred embodiment of the present invention uses a polygon-based rendering system to update the display whenever the user moves her location in the scene. When the user stops moving, a background process is initiated which uses the polygon-based rendering system to create a low-quality image-based representation of the image from that particular location. Once an image-based representation of the scene has been completed at some acceptable quality level, the image-based renderer is used to display the scene. If the user looks around, she sees an image-based scene. The time interval in which the user stays in one location is utilized to improve the image-based representation of the scene by using a more complex model of the scene or by using a more complex rendering approach. When the user moves her location in the scene (rather than simply changing her view direction), the polygon-based rendering system is again applied to update the display as the user moves.

DESCRIPTION OF THE INVENTION

The present invention relates to an improvement on a walk-through rendering system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
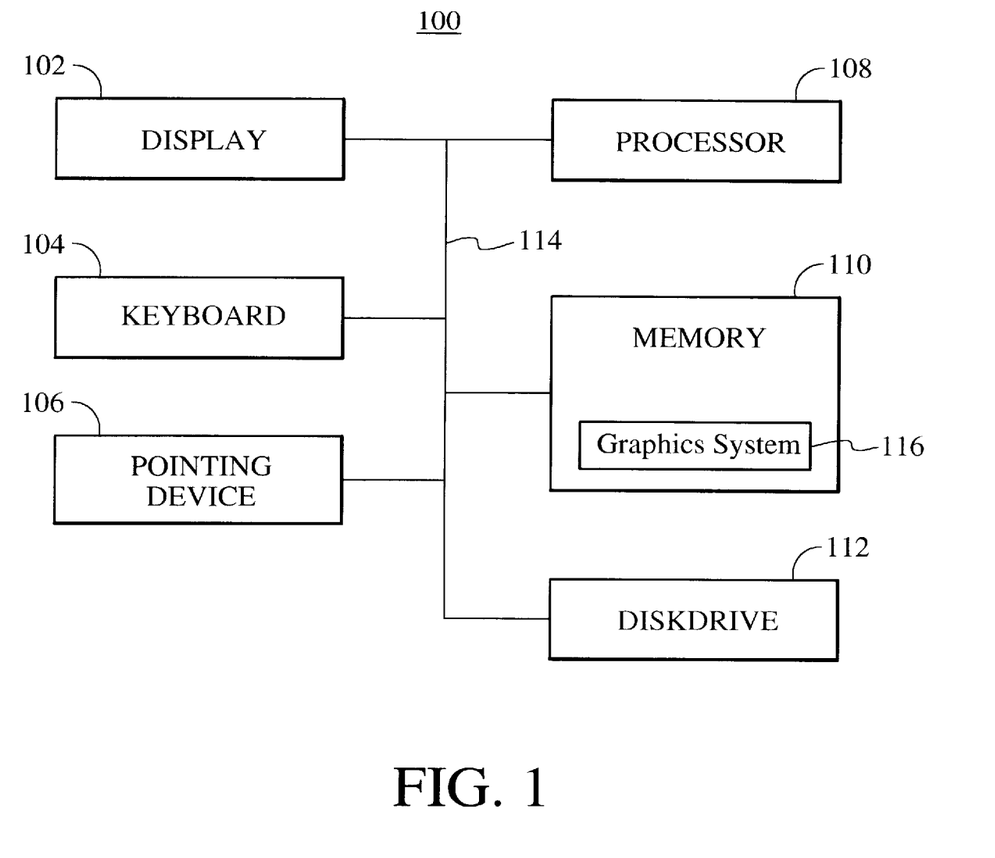
FIG. 1 is block diagram of a system which can accommodate the graphics system of the present invention.

FIG. 1 is a block diagram illustrating a conventional computer system 100, which includes a display 102, a keyboard 104, a pointing device 106, a processor 108, a memory 110, and a disk drive 112, which are all connected by a bus 114. The processor 108 operates in conjunction with the memory 110 to execute a graphics system 116 in accordance with the present invention. Information regarding the images to be generated are typically located in the memory 110. In a preferred embodiment, the graphics system, along with the data used by the graphics system, may be loaded onto the computer system via the conventional disk drive 112 or a network.

Figure 2:
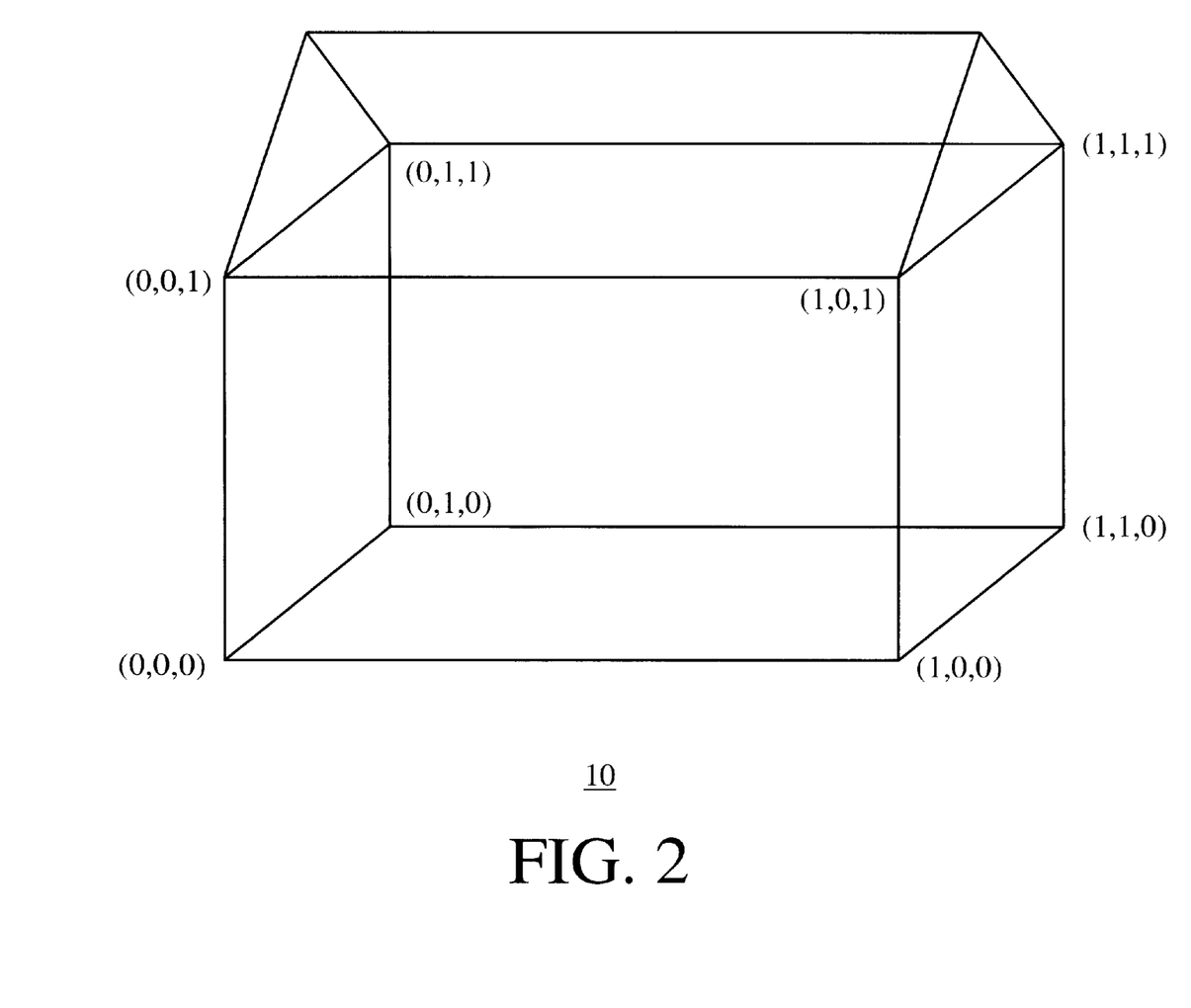
FIG. 2 illustrates an image created by the polygon-based rendering system.

FIG. 2 illustrates an image created by a conventional polygon-based rendering system by the graphics system 116. It identifies a polygon, for instance by the location of each corner of the polygon. In the example shown in FIG. 2, the side of the house 10 closest to the viewer can be identified by the four corners (0, 0, 1), (1, 0, 1), (1, 0, 0), and (0, 0, 0). Likewise, the side of the house to the right of the viewer can be identified by its four corners: (1, 0, 1), (1, 1, 1), (1, 1, 0), and (1, 0, 0). These polygons are each created and positioned to form an image such as the house 10 shown in FIG. 2.

Each of these polygons can have a color associated with it to create a full color image. The user may also identify a particular color to a corner or a location, and another color to a different location, thereby creating an image with two different colors in two different locations and a gradual change of color from the first color to the second color in the area between the two locations. For instance, the user could choose the color yellow for the corners identified by (0,0,1) and (0,0,0) and select the color red for the corners identified by (1,0,1) and (1,0,0). The resultant image would have yellow on one side of the polygon and red on the other side of the polygon with a gradual change from yellow to red in the area between the two colors. The user would also have the option of looking at the generated image from every different angle. For instance, the house 10 may rotate as if to simulate the actual view of a house 10 as the viewer is walking around the house 10.

Figure 3:
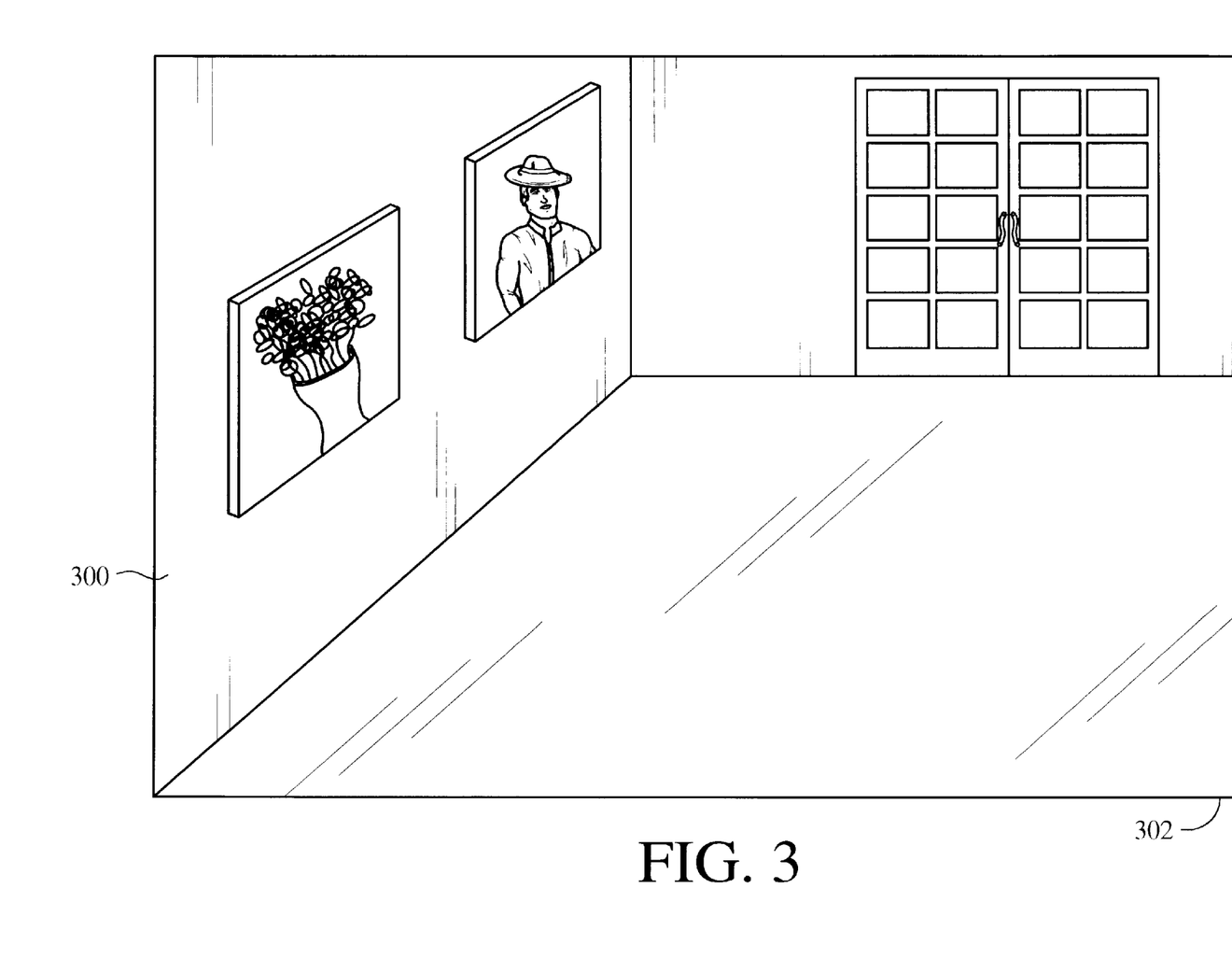
FIG. 3 is an illustration of texture mapping under the polygon-based rendering system.

FIG. 3 illustrates another option available under the conventional polygon-based rendering system. It illustrates a picture 300 inside of a polygon 302. This pasting of pictures 300 onto a polygon 302 is known as texture mapping. These pictures 300 can be fully colored pictures 300 and the user may look at the pictures 300 from various angles just as the user may look at the polygon 302 from various angles.

The walk-through systems using polygon-based rendering allow complete freedom of movement within the modeled environment. The users can change both their location within the scene, and their view direction from that scene. Typically, the quality of the image can be improved by increasing the amount of computation allowed, either by taking more time on the same platform, or by increasing the computational power of the platform on which the image is being rendered. For polygon-based walk-through rendering systems, the amount of time available for computing an image is constrained by the requirement that the image respond interactively to the user's input. This can mean generating fifteen or more new images each second. Typically, hardware acceleration has been a very popular approach to increasing the computational power of the system and hence increasing the allowable complexity of a scene and the quality with which it can be rendered.

A conventional image-based rendering system is an alternative to the conventional polygon-based rendering system. Looking around will be referred to as changing "view direction", while changing the user's location, or moving, will be referred to as changing her "view position". The images projected by the image-based rendering system display the view from a single view position. If the view position shifts, then a new image from a new viewpoint must be generated.

Figure 4A:
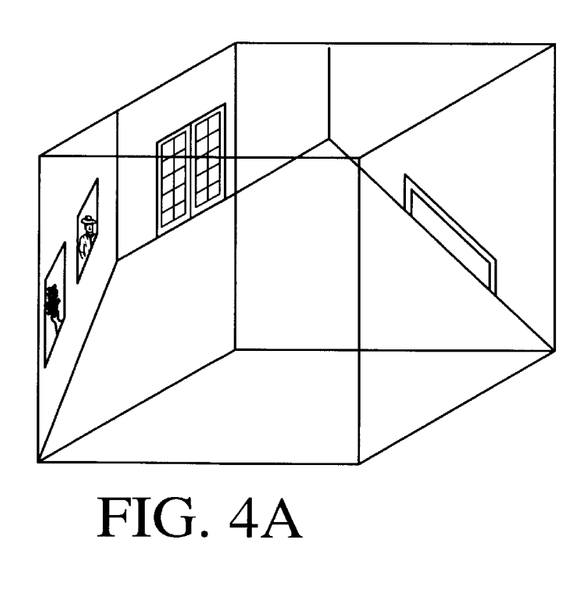
FIGS. 4A–4C show an image-based rendering system's projection of an image inside a hypothetical container such as a sphere, a box, or a cylinder.
Figure 4B:
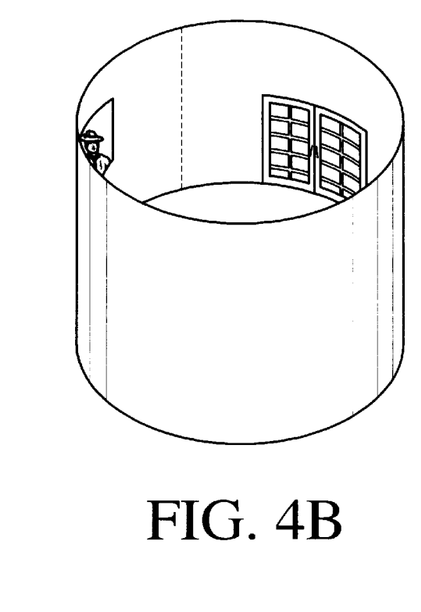
Figure 4C:
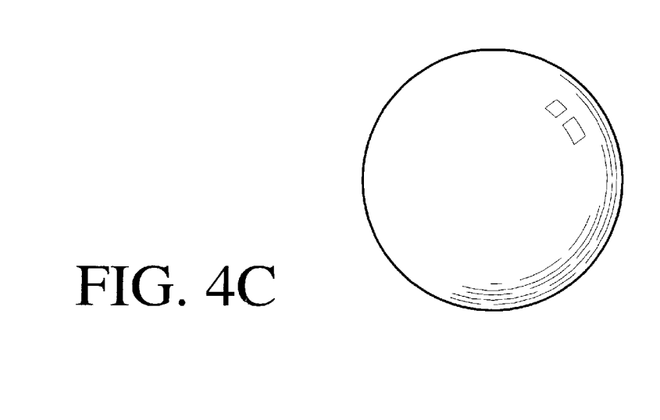

When the image-based rendering system is used in a box form such as FIG. 4(a), the results will be the same as using the polygon-based rendering system with texture mapping as shown in FIG. 3. Although the algorithms used by the two different systems will be different, the results will be the same as long as the viewpoint is the same. However, the implementation of the image-based rendering system will typically be much faster than the polygon-based rendering system, due to its specialization.

A walk-through rendering system utilizing image-based rendering may constrain either or both the user's location and their viewing direction at run-time. Because image-based rendering systems resample source images of a scene, rather than relying on a polygonal representation of that scene, the imagery can be as complex as the image representation allows without affecting the computational cost. In particular, the image representation of the scene can be photographic, or can be prerendered over a considerable period of time, as only the run-time resampling must take place at interactive rates. Run-time performance depends on the size and number of images representing the scene, not on the scene's complexity. Systems such as QuickTime VR will generate the same number of frames per second for a scene which is completely black as for a scene in which every pixel of the source imagery is different. For walk-through systems, image-based rendering systems can provide photographic quality at the cost of constrained movement.

In the broadest context, the present invention utilizes a geometry-based rendering approach when a user's position is changing and an image-based representation of a screen when the user's position is not changing. In so doing, the freedom of movement afforded by the geometry-based image approach can be accomplished while still obtaining the image quality associated with image-based rendering.

Figure 5:
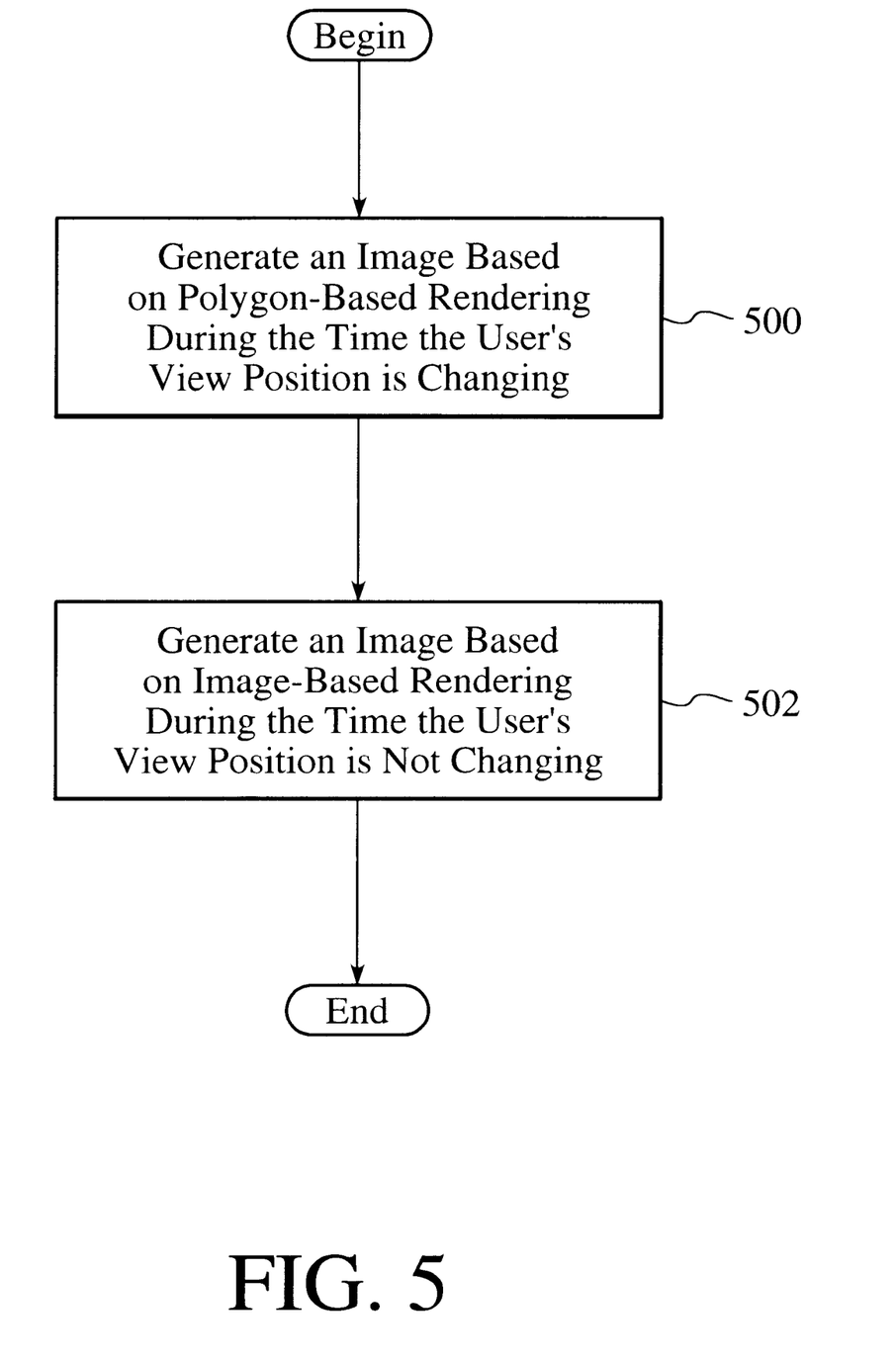
FIG. 5 is a flow diagram of general concepts of the present invention.

FIG. 5 is a flow diagram showing the operating sequence of a graphics rendering system in accordance with the present invention. An image is generated based on polygon-based rendering during the time the user's view position is changing via step 500. When the user's view position is not changing, an image is generated based on image-based rendering via step 502.

The preferred embodiment of the present invention uses a polygon-based rendering system to update the display whenever the user changes her view position by moving through a scene. A level of complexity in the scene model is selected to allow updating of the display at interactive rates. When the user stops moving, a background process is initiated which uses a polygon-based rendering system to create a low-quality image-based representation of the image from that particular location. Once an image-based representation of the scene has been completed at some acceptable quality level, the image-based renderer is used to display the scene. If the user changes her view direction, she sees an image-based scene. As more time elapses after reaching the first acceptable quality level, the remainder of the time in which the user stays in one location is used to generate the next acceptable quality level. Once the next acceptable quality level has been reached, the image can be updated to present a higher-quality image. The time interval in which the user stays in one location is utilized to improve the image-based representation of the scene by using a more complex model of the scene or by using a more complex rendering approach. The user may look around in various directions and still see an improved image-based representation of the scene. When the user moves her location in the scene (rather than simply changing her view direction), the polygon-based rendering system is again directly applied to update the display as the user moves.

For example, if the polygon-based rendering system renders a simple version of the scene at 30 frames per second, and the image-based renderer uses a cubic representation of the scene (i.e., six texture-mapped planes forming a cube), completing the first acceptable quality level of the scene whenever the user stops moving will take approximately $\frac{6}{30}=1/5$ of a second. At this point, any view from that location in the scene can be generated using this cubic representation by the image-based renderer. The resulting quality of the image will, in most cases, be roughly equivalent to the corresponding image which could be generated by the polygon-based renderer. However, if at this point the user is still in the same location, the next acceptable quality level of the image can be completed, thus improving the quality of the cubic image representation. This progressive refinement approach can continue as long as the background processing power is available and as long as the user has not changed her location.

Figure 6:
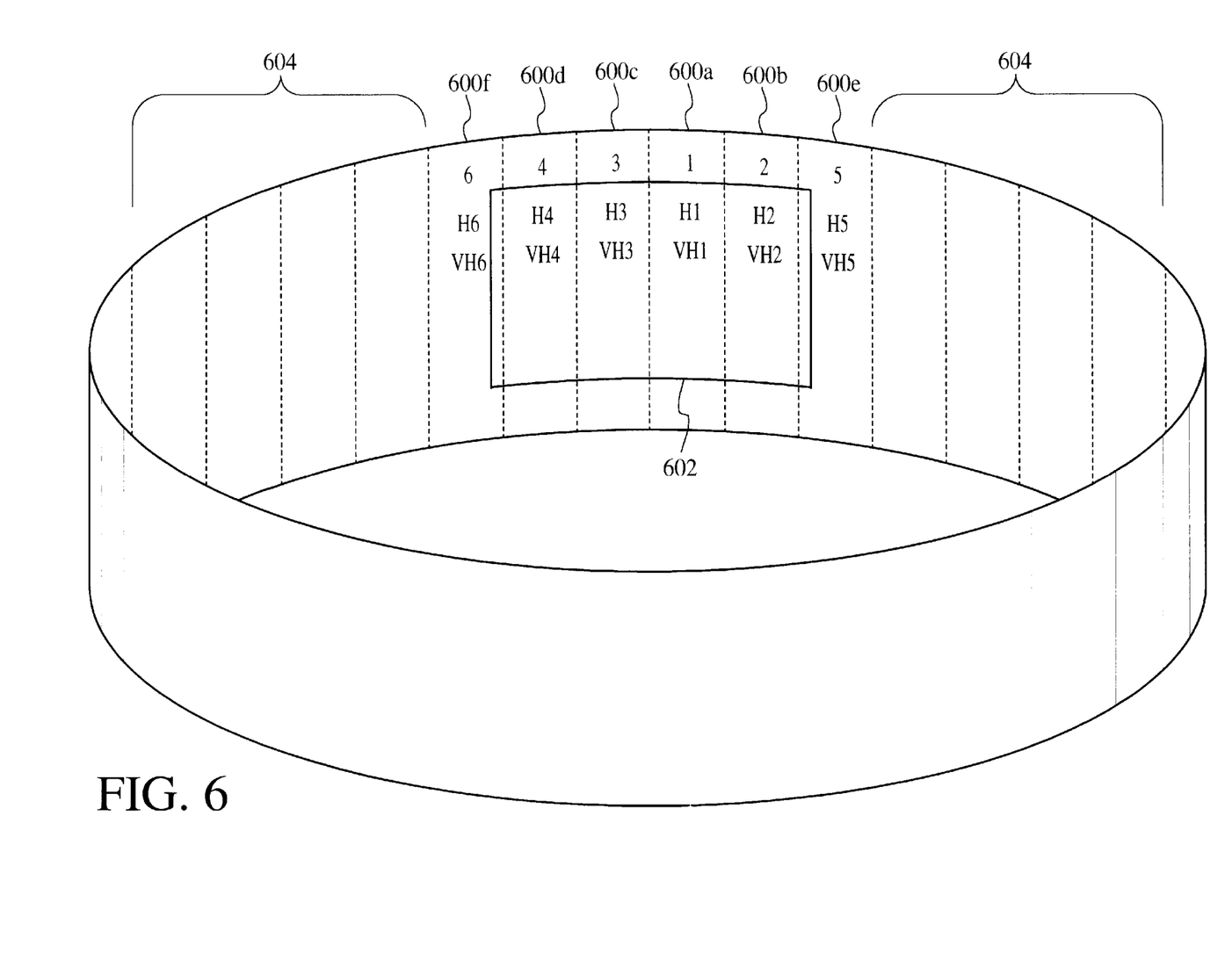
FIG. 6 is an illustration of a preferred embodiment of the present invention.

In particular, FIG. 6 illustrates one possible progressive refinement approach according to the present invention. FIG. 6 illustrates this method in the example of an image projected upon a cylinder 610 in which the image has been partitioned into different parts 600a–600f. Within the cylinder 610, there is shown a visible part 602, which is visible to a user, within parts 600a–600f within an image buffer. Conceptually, the image buffer is the area inside the cylinder 610 in which the image is projected. The parts 604 do not contain any portion of the visible part 602 which is visible to the user. One method of image rendering and displaying of that image is to prioritize parts 600a–600f for image rendering. For instance, if the user is directly viewing part 600a or some portion thereof, the priority may spread out from part 600a. The farther the part 600 from 600a, the lower the priority. The first level of quality of the image may be rendered in the order of part 600a, 600b, 600c, 600d, 600e, and 600f.

Once the first level of acceptable image quality has been rendered in the buffer, the image can be displayed. The next rendering process can be for a higher level of image quality, again starting with part 600a, working its way outward until it reaches part 600f. The image is again displayed once the second level of acceptable quality has been rendered. The method will be repeated with the next higher level of quality starting again with part 600a. Once either a predefined or the final level of image quality has been rendered and displayed, the parts 604 which do not include any portion of the visible area 602 can now begin rendering starting at the lowest quality image level.

Figure 7:
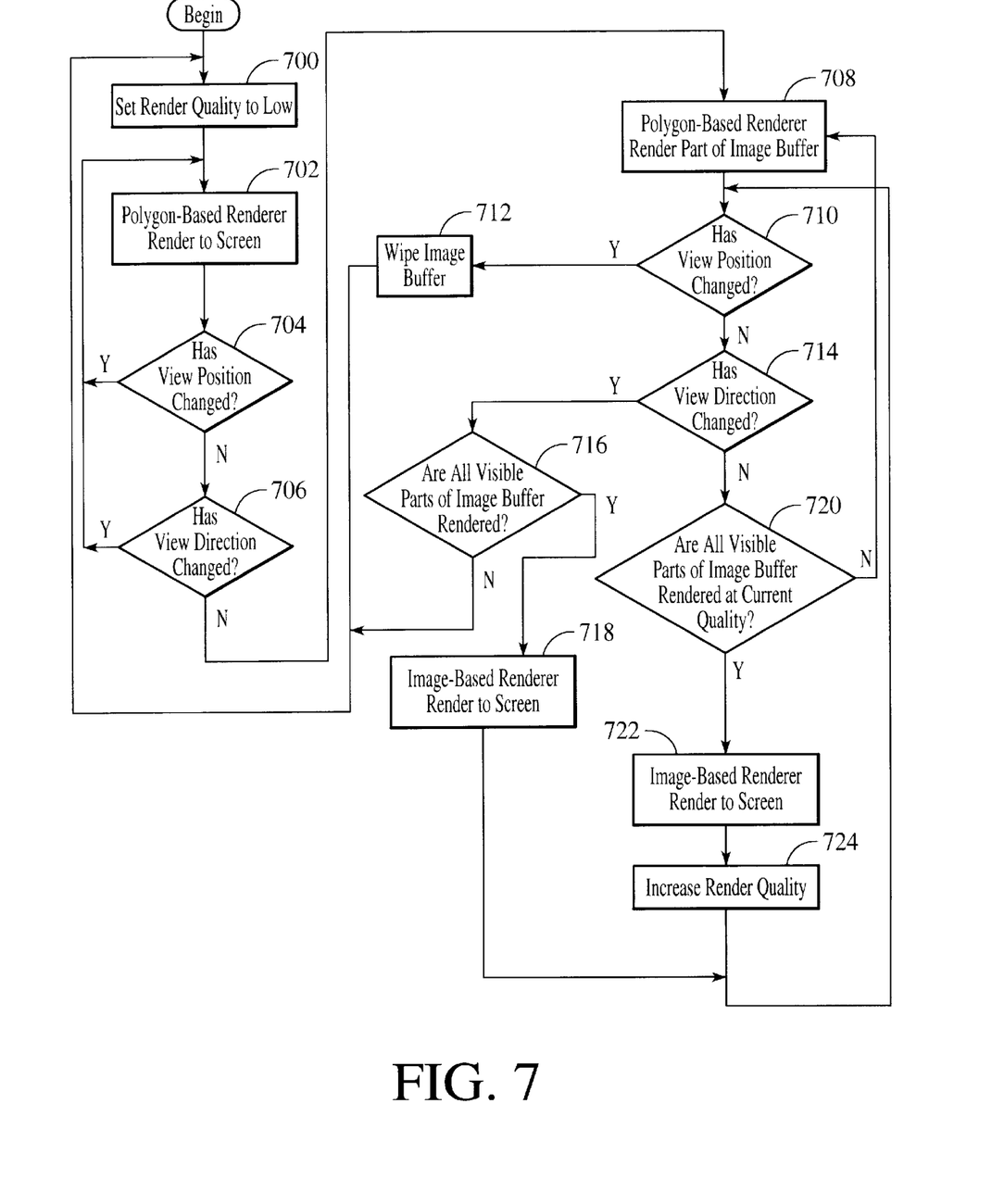
FIG. 7 is a flow diagram of the method according to the preferred embodiment of the present invention.

FIG. 7 illustrates a method of image rendering which would accomplish the example shown in FIG. 6. The method begins with setting the render quality to low via step 700. The polygon-based renderer is used to render the image to the screen via step 702. It is then determined whether the user's view position has changed via step 704. If the view position has changed, the polygon-based renderer renders the appropriate image to the screen via step 702. If the view position of the user has not changed, then it is determined whether the view direction of the user has changed via step 706. If so, then the polygon-based renderer renders the appropriate image to the screen via step 702. If the view direction has not changed, then background processing of the image buffer can begin: the polygon-based renderer renders at least one part of the image buffer via step 708.

It is then determined whether the view position has changed via step 710. If so, the image buffer is erased via step 712 and the procedure returns to the beginning where the image quality is set to low via step 700 and the normal polygonal rendering process continues. If, however, the view position has not changed, then it is determined whether the view direction has changed via step 714. If the view direction has changed, then it is determined whether all visible parts of the image buffer have been rendered via step 716. If not all visible parts of the image buffer has been rendered, then the process returns to the beginning where the quality of the image is set to low via step 700.

If all visible parts of the image buffer have been rendered, then the image-based renderer is used and the image is rendered to the screen via step 718. It is then again determined whether the view position has changed via step 710. Assuming that the view position has not changed and the view direction has also not changed in step 714, then it is determined whether all visible parts of the image buffer have been rendered at the current quality via step 720. If not, then the polygon-based renderer is used to render another portion of the image buffer via step 708. If all of the visible parts of the image buffer have been rendered at the current quality, then the image-based renderer is used and the appropriate image is rendered to the screen via step 722. The render quality is then increased via step 724 to start progressive refinement of the source image and the procedure returns to determining whether the view position has changed in step 710.

Figure 8:
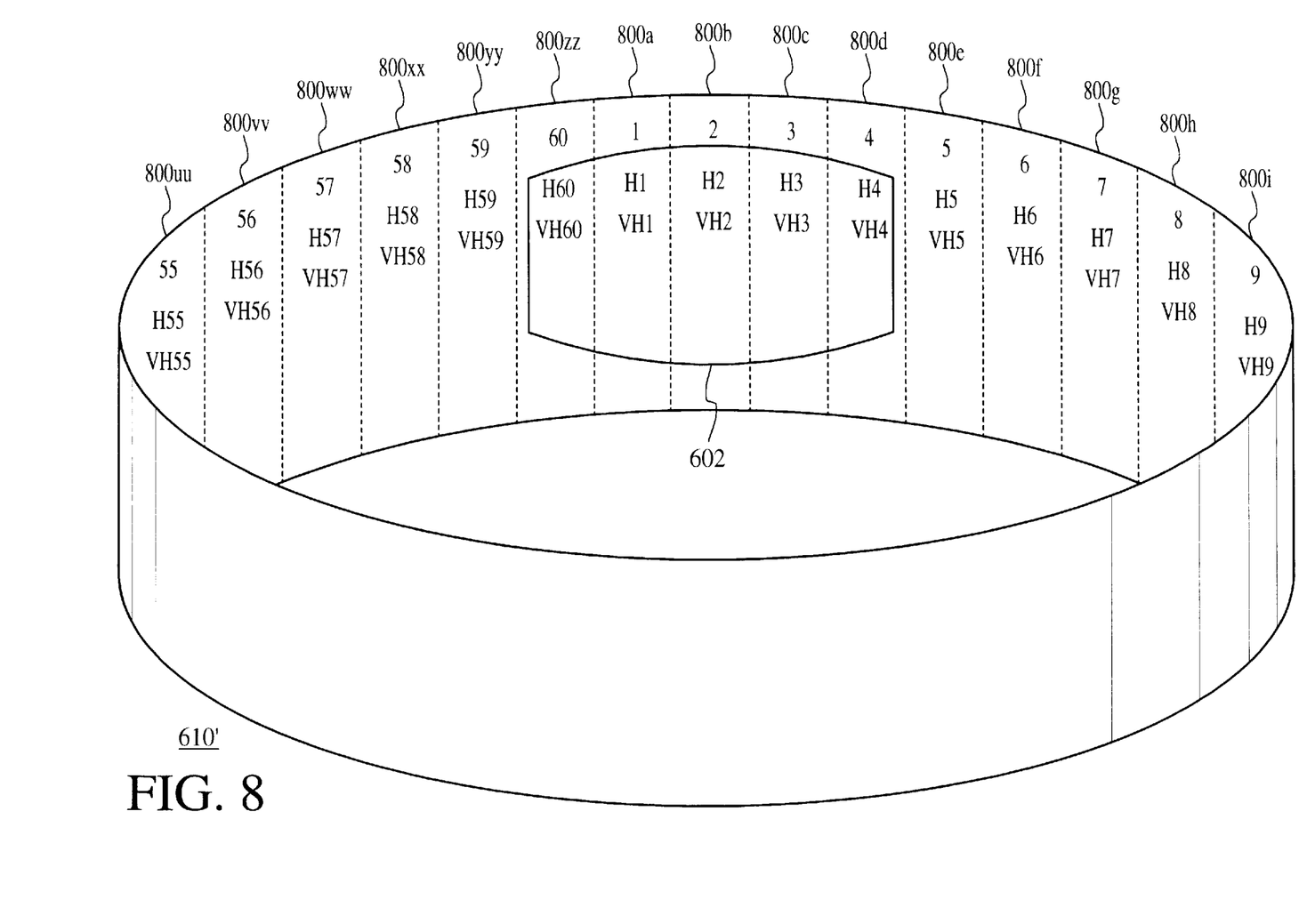
FIG. 8 is an illustration of another embodiment of the present invention.
Figure 9:
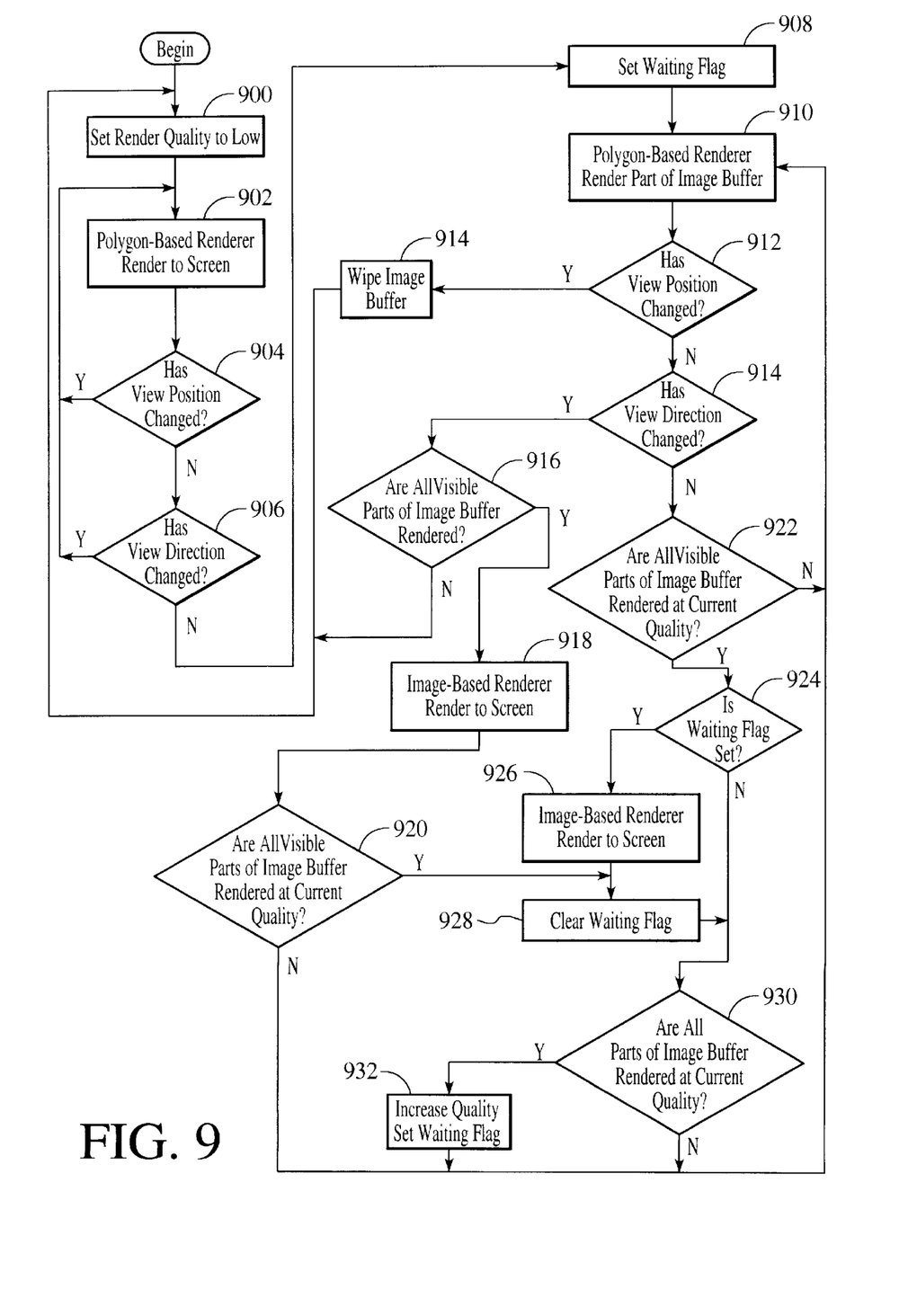
FIG. 9 is a flow diagram of a method according to the embodiment of the present invention shown in FIG. 8.

Another embodiment of the present invention is illustrated in FIGS. 8 and 9. FIG. 8 shows an image projected onto a cylinder 610' where the image buffer 800 is separated into parts 800a–800zz. Within the image buffer, the visible part 602' of the image buffer is separated into various parts 800zz–800d. In this embodiment, the rendering of the image buffer 800 begins at a given point, for example part 800a, and each image buffer part 800a–800zz is rendered until the first acceptable level of image quality has been rendered. Then the next level of image quality will begin rendering at part 800a until all of the parts within the image buffer 800 have been rendered. This process continues until either the view position changes or the final level of image quality is reached. Each time a level of image quality has been completely rendered, the image is displayed on the screen.

FIG. 9 illustrates a method in which a system according to the present invention can accomplish the procedure illustrated in FIG. 8. The method begins with setting the render quality low via step 900. The polygon-based renderer is used to render an image to the screen via step 902. Then it is determined whether the view position of the user has changed via step 904. If so, then the polygon-based renderer is used and an image is rendered to the screen via step 902. If the view position has not changed, then it is determined whether the view direction has changed via step 906. If the view direction has changed, then the polygon-based renderer is again used to render an appropriate image to the screen via step 902. If neither the view position nor the view direction has changed, then a waiting flag is set via step 908.

The polygon-based renderer is used to render part of the image buffer via step 910. At this time, it is again determined whether the view position has changed via step 912. If so, then the image buffer is erased via step 914 and the process returns to the beginning where the image quality is set to low via step 900. If the view position has not changed in step 912, then it is determined whether the view direction has changed in step 914. If so, then it is determined whether all visible parts of the image buffer have been rendered via step 916.

If not all visible parts of the image buffer have been rendered, then the procedure returns to the beginning where the image quality is set to low in step 900. If all parts of the image buffer have been rendered via step 916, then the image-based renderer is used to render the image to the screen in step 918.

It is then determined whether all visible parts of the image buffer are rendered at the current quality via step 920. If not all visible parts of the image buffer have been rendered at the current quality, then the polygon-based renderer is used to render a remaining part of the image buffer via step 910. However, if all visible parts of the image buffer have been rendered at the current quality, then the waiting flag is cleared via step 928 and it is determined whether all parts of the image buffer are rendered at the current quality via step 930. If so, then the image quality is increased to the next level and the waiting flag is set via step 932. The polygon-based renderer is then used to render part of the image buffer via step 910. If not all parts of the image buffer are rendered at the current quality, then, again, the polygon-based renderer is used to render part of the image buffer via step 910.

If neither the view position nor the view direction has changed via steps 912 and 914, then it is determined whether all visible parts of the image buffer have been rendered at the current quality via step 922. If not, then the polygon-based renderer is used to render part of the image buffer via step 910. If, however, all visible parts of the image buffer have been rendered at the current quality, it is determined whether the waiting flag is set via step 924. If the waiting flag is set, then the image-based renderer is used to render an image to the screen via step 926. The waiting flag is then cleared via step 928.

If it is determined that the waiting flag is not set via step 924, then it is determined whether all parts of the image buffer are rendered at the current quality via step 930. If not, then the polygon-based renderer is used to render parts of the image buffer via step 910. If, however, all the parts of the image buffer are rendered at the current quality, then the image quality is increased and the waiting flag is set via step 932, and the polygon-based renderer is used to render part of the image buffer via step 910.

A system and method in accordance with the present invention can utilize simply the polygon-based rendering system to create the same effect as described in the preferred embodiment. When the user is moving, the polygon-based rendering system renders images to update the display. When the user stops, the polygon-based rendering system utilizes texture-mapped planes 302, such as those illustrated in FIG. 3, forming a box to present a first acceptable quality level of the image which is equivalent to an image created by an image-based rendering system using a box. If by the time the polygon-based rendering system has reached the first acceptable quality level, a more complex model of the scene can be used by the renderer, thus improving the quality of the image representation. This progressive refinement approach can continue as long as the background processing power is available and as long as the user has not changed her location.

The present invention contemplates a method and system which uses a rendering method which displays the generated image at any point during the generation. For clarity, two embodiments have been described illustrating two of the many possible ways in which the image generated in accordance with the present invention can be accomplished.

The present invention is a method for, or a computer-readable medium containing instructions for, a walk-through image rendering system in a data processing system providing an image based on a geometry-based rendering approach in which a user's view position is changing. It also provides a second image based on an image-based representation of a scene in which the user's view position is not changing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for a walk-through rendering system in a data processing system, comprising the steps of:
   (a) providing a first image of a scene based on a geometry-based rendering approach in which a user's view position is changing; and
   (b) providing a second image of a scene based on an image-based representation of the scene in which the user's view position is not changing.

2. The method of claim 1, in which step (b) further comprises step (b1) of providing a background process to provide the second image.

3. The method of claim 2, wherein a polygon-based rendering system is used in providing the background process.

4. The method of claim 2, wherein the second image is provided once it has been completed at a predetermined quality level.

5. The method of claim 2, wherein the second image is provided once a portion of the scene in the direction in which the user is viewing is completed at a predetermined quality level.

6. The method of claim 2, wherein the second image is provided once a predetermined set of view directions is completed at a predetermined quality level.

7. The method of claim 2, wherein the second image is improved during a time in which the user's view position is not changing.

8. The method of claim 1, wherein a level of complexity in a scene model used to provide the first image allows updating of a display at interactive rates.

9. The method of claim 1, wherein the geometry-based rendering approach is a polygon-based rendering approach.

10. The method of claim 1, further comprising step (c) of using an image-based renderer to display a third image in which a user's view direction is changing.

11. A walk-through rendering system comprising:
   a geometry-based renderer for providing a first image of a scene in which a user's view position is changing; and
   a background processor for providing a second image of a scene based on an image-based representation of the scene in which the user's view position is not changing.

12. The system of claim 11, wherein a polygon-based renderer is used in providing the background process.

13. The system of claim 11, wherein the second image is provided once it has been completed at some quality level.

14. The system of claim 11, wherein the second image is provided once a portion of the scene in the direction in which the user is viewing is completed at a predetermined quality level.

15. The system of claim 11, wherein the second image is provided once a predetermined set of view directions is completed at a predetermined quality level.

16. The system of claim 11, wherein the second image is improved during a time in which the user's view position is not changing.

17. The system of claim 11, wherein a level of complexity in a scene model used to provide the first image allows updating of a display at interactive rates.

18. The system of claim 11, further comprising an image-based renderer to display a third image in which a user's view direction is changing.

19. A computer-readable medium containing program instructions for a walk-through rendering system in a data processing system, comprising the program instructions for:

(a) providing a first image of a scene based on a geometry-based rendering approach in which a user's view position is changing; and (b) providing a second image of a scene based on an image-based representation of the scene in which the user's view position is not changing.

20. The computer-readable medium of claim 19, further comprising step (b1) of providing a background process to provide the second image.

21. The computer-readable medium of claim 20, wherein a polygon-based rendering system is used in providing the background process.

22. The computer-readable medium of claim 20, wherein the second image is provided once it has been completed at a predetermined quality level.

23. A method for a walk-through rendering system in a data processing system, comprising the steps of:

a) providing a scene;

b) providing a first image of the scene from a user's view position using a geometry-based rendering;

c) updating the first image as the user's view position is changing;

d) providing a second image of the scene from a particular user's view position when the user's view position is stationary;

e) progressively refining the second image using an image-based rendering for providing a progressively refined second image of the scene while the user's view position remains stationary;

f) updating the progressively refined second image as a user's view direction is changing; and g) providing the first image of the scene from a current user's view position when the user's view position changes from the particular user's view position, the first image being updated as the user's view position is changing.

24. The method of claim 23, wherein the scene providing step (a) further the step of:

a1) providing a level of complexity, the level of complexity being selected to allow updating of a display of the scene at interactive rates.

25. The method of claim 23, wherein the second image providing step (d) further comprises the step of:

d1) initiating a background process to create the second image, the second image being an acceptable low-quality image based representation of the scene from the particular user's view position.

26. The method of claim 23, wherein the second image providing step (d) further comprises the step of:

d2) updating the second image as the user's view direction is changing.

27. The method of claim 23, wherein the progressively refining step (e) further comprises the steps of:

e1) partitioning the second image into a plurality of parts, the plurality of parts including visible area parts and non-visible area parts;

e2) providing a first priority level to each of the visible area parts in ascending order such that one part among the plurality of parts receives a highest priority and another part which is farthest from the one part receives a lowest priority;

e3) providing image-based rendering of the visible area parts based on the first priority levels;

e4) providing a second priority level to each of the visible area parts and the non-visible area parts, the priority being provided in ascending order such that one part among the plurality of parts receives the highest priority and another part which is farthest from the one part receives the lowest priority, wherein the highest priority is provided to the one part which is viewed directly by the user; and e5) providing image-based rendering of the plurality of parts based on the second priority levels.

28. The method of claim 27, wherein the image based rendering of the visible areas is provided at a first level of image quality, and wherein the step (e3) of providing image-based rendering of the visible area parts further comprises the step of:

e3a) providing the image-based rendering at progressively higher level of image quality; and e3b) repeating step (e3a) until the progressively higher level of image quality is at one of a predetermined level and a final level.

29. The method of claim 28, wherein the progressively refining the second image (e) continues as long as the background process is available and as long as the user's view position is stationary.

* * * * *